(12) United States Patent
Sekizuka

(10) Patent No.: US 11,083,651 B2
(45) Date of Patent: Aug. 10, 2021

(54) WHEELCHAIR FIXING DEVICE

(71) Applicant: Toyota Jidosha Kabushiki Kaisha, Toyota (JP)

(72) Inventor: Makoto Sekizuka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/854,197

(22) Filed: Apr. 21, 2020

(65) Prior Publication Data
US 2021/0000667 A1   Jan. 7, 2021

(30) Foreign Application Priority Data

Jul. 4, 2019 (JP) ............................. JP2019-125375

(51) Int. Cl.
*A61G 3/08* (2006.01)
*B60R 11/04* (2006.01)

(52) U.S. Cl.
CPC ............ *A61G 3/0808* (2013.01); *B60R 11/04* (2013.01); *B60R 2300/8006* (2013.01)

(58) Field of Classification Search
CPC ............... A61G 3/0808; A61G 3/0209; A61G 2200/54; A61G 3/08; A61G 5/045; B60R 9/06; B60R 2022/207; B60R 22/00; B60R 22/18; B60R 22/20; B60R 22/201; B60R 22/22; B60R 22/24
USPC ...... 410/23, 7, 12, 3, 97, 4, 100, 20, 89, 81, 410/66; 414/537, 563, 921; 296/65.04, 296/37.6, 193.09, 203.02, 61
See application file for complete search history.

(56) References Cited

U.S. PATENT DOCUMENTS

| | | | |
|---|---|---|---|
| 7,429,155 B2* | 9/2008 | Sakano | A61G 3/0808 |
| | | | 410/7 |
| 9,061,655 B2* | 6/2015 | Verachtert | A61G 3/08 |
| 10,285,880 B1* | 5/2019 | Ghannam | B60P 7/0892 |
| 2014/0271020 A1* | 9/2014 | Girardin | B60P 7/0823 |
| | | | 410/23 |

FOREIGN PATENT DOCUMENTS

| | | |
|---|---|---|
| JP | H0889532 A | 4/1996 |
| JP | 2001-212179 A | 8/2001 |
| JP | 2002-360636 A | 12/2002 |
| JP | 2007-222278 A | 9/2007 |
| JP | 2015-036582 A | 2/2015 |
| JP | 2016-159723 A | 9/2016 |
| JP | 2018-089525 A | 6/2018 |

\* cited by examiner

*Primary Examiner* — D Glenn Dayoan
*Assistant Examiner* — Sunsurraye Westbrook
(74) *Attorney, Agent, or Firm* — Dinsmore & Shohl LLP

(57) ABSTRACT

A wheelchair fixing device includes: a belt member having one end wound around a retractor and the other end attachable to a wheelchair or an attachment portion in a vehicle cabin; a lock mechanism provided in the retractor and performing electrical switching between a locked state in which the belt member is disabled to be pulled out and an unlocked state in which the belt member is enabled to be pulled out; and a switching unit switching the lock mechanism to the locked state when the other end of the belt member is attached to the wheelchair or the attachment portion, and switching the lock mechanism to the unlocked state when the other end of the belt member is detached in a stopped state of a vehicle.

8 Claims, 8 Drawing Sheets

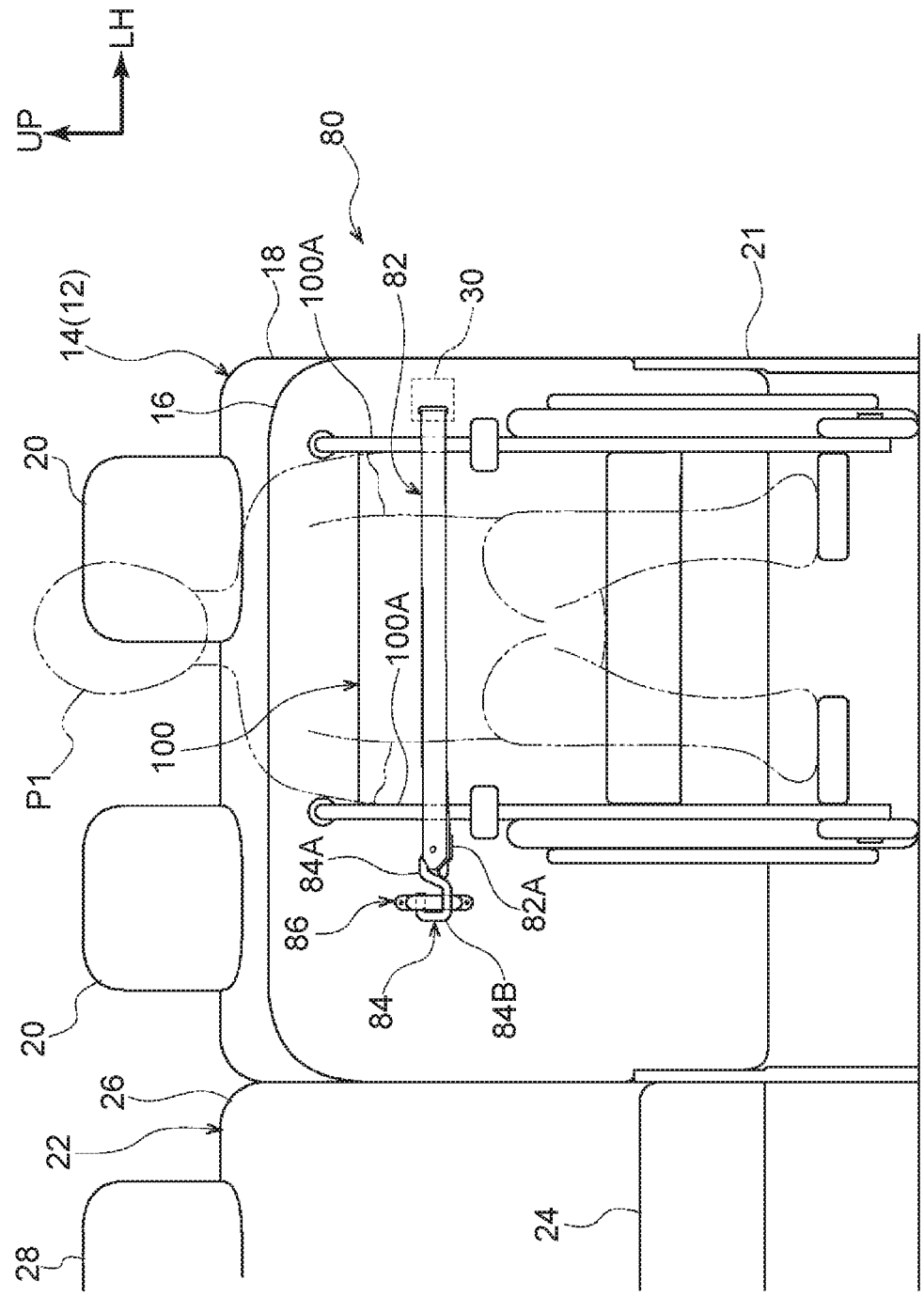

WHEELCHAIR FIXING DEVICE

CROSS-REFERENCE TO RELATED APPLICATIONS

This application claims priority to Japanese Patent Application No. 2019-125375 filed on Jul. 4, 2019, which s incorporated herein by reference in its entirety including the specification, drawings and abstract.

BACKGROUND

1. Technical Field

The disclosure relates to a wheelchair fixing device.

2. Description of Related Art

Japanese Patent Application Publication No. 2007-222278 (JP 2007-222278 A) discloses a belt device for securing a wheelchair to the inside of a vehicle cabin. In this belt device, an operation panel located behind the wheelchair is operated to turn on a solenoid, to thereby pull out a belt. After the belt is pulled out and the wheelchair is secured, the operation panel is operated to turn off the solenoid, to thereby lock the pull-out of the belt.

SUMMARY

Unfortunately, in the structure described in JP 2007-222278 A, it is necessary for a user such as an occupant seated in the wheelchair and a caregiver and the like to operate the operation panel, and it takes time to secure the wheelchair and release the securing of the wheelchair.

In light of the above facts, the present disclosure provides a wheelchair fixing device that can reduce time required for securing a wheelchair and releasing the securing of the wheelchair.

A wheelchair fixing device as set forth in a first aspect, includes: a belt member formed in a long shape and having one end wound around a retractor and the other end configured to be attachable to a wheelchair or an attachment portion in a vehicle cabin; a lock mechanism provided in the retractor and performing electrical switching between a locked state in which the belt member is disabled to be pulled out and an unlocked state in which the belt member is enabled to be pulled out; and a switching unit switching the lock mechanism to the locked state when the other end of the belt member is attached to the wheelchair or the attachment portion, and switching the lock mechanism to the unlocked state when the other end of the belt member is detached in a stopped state of a vehicle.

In the wheelchair fixing device as set forth in the first aspect, one end of the long belt member is wound around the retractor. The other end of the belt member is configured to be attachable to the wheelchair or the attachment portion in the vehicle cabin. Furthermore, the retractor is provided with the lock mechanism, and the lock mechanism performs electrical switching between the locked state in which the belt member is disabled to be pulled out and an unlocked state in which the belt member is enabled to be pulled out. Thereby, it is possible to pull out the belt member from the retractor in the unlocked state, to thereby secure the wheelchair. In addition, the movement of the wheelchair can be restrained by electrically switching the lock mechanism to the locked state while the wheelchair is secured.

Further, there is provided the switching unit for setting the lock mechanism to the locked state when the other end of the belt member is attached to the wheelchair or the attachment unit. Thus, only by attaching the belt member to the wheelchair to secure the wheelchair, or only by attaching the belt member to the attachment portion to secure the wheelchair, the user can disable the belt member to be pulled out. In the meantime, since the switching unit switches the lock mechanism to the unlocked state when the other end of the belt member is detached in the stopped state of the vehicle, the user can pull out the belt member without performing a special operation. Here, the meaning that "when the other end of the belt member is detached" broadly includes a state ranging from start of detaching action of the other end of the belt member to completion of the detaching.

The wheelchair fixing device as set forth in a second aspect of the first aspect, further includes an imaging unit capturing an image of an inside of the vehicle cabin including a securing space of the wheelchair, and from the image captured by the imaging unit, the switching unit switches the lock mechanism to the locked state when it is determined that the other end of the belt member is in a state of being attached to the wheelchair, and switches the lock mechanism to the unlocked state when it is determined, from the image, that the other end of the belt member is detached from the wheelchair.

In the wheelchair fixing device as set forth in the second aspect, as the user attaches the belt member to the wheelchair, it is determined, from the image captured by the imaging unit, that the belt member is attached to the wheelchair, and thus the lock mechanism is switched to the locked state. That is, the belt member is disabled to be pulled out. On the other hand, when the user tries to detach the belt member from the wheelchair in the stopped state of the vehicle, it is determined, from the image captured by the imaging unit, that the belt member is detached, and thus the lock mechanism is switched to the unlocked state. That is, the belt member is enabled to be pulled out.

The wheelchair fixing device as set forth in a third aspect of the second aspect, is configured such that when the wheelchair is not detected in an image range of the imaging unit, the switching unit switches the lock mechanism to the locked state, and when the wheelchair is detected in the image range of the imaging unit and before the other end of the belt member is attached to the wheelchair, the switching unit switches the lock mechanism to the unlocked state.

In the wheelchair fixing device as set forth in third aspect, when there is no wheelchair in the securing space of the wheelchair, the belt member is set to be disabled to be pulled out. Thereby, it is possible to prevent another occupant from pulling out the belt member by mistake. On the other hand, when the wheelchair having entered the vehicle moves to the securing space, the wheelchair is detected in the imaging range of the imaging unit, and thus the lock mechanism is switched to the unlocked state, to thereby enable the belt member to be pulled out.

The wheelchair fixing device as set forth in a fourth aspect of the first aspect, is configured such that the switching unit is provided in the attachment portion; and the lock mechanism is switched to the locked state by the switching unit when the belt member is attached to the attachment portion, and the lock mechanism is switched to the unlocked state by the switching unit when the belt member is detached from the attachment portion.

In the wheelchair fixing device as set forth in the fourth aspect, the user attaches the belt member to the attachment portion, to thereby switch the lock mechanism to the locked state by the switching unit. That is, the belt member is disabled to be pulled out. On the other hand, the user detaches the belt member from the attachment portion in the stopped state of the vehicle, to thereby switch the lock mechanism to the unlocked state by the switching unit. That is, the belt member is enabled to be pulled out. In this manner, the lock mechanism can be directly switched on the attachment portion side.

The wheelchair fixing device as set forth in a fifth aspect of the fourth aspect, is configured such that the attachment portion is provided on an opposite side of the wheelchair from the retractor in a state in which the wheelchair is secured; and the other end of the belt member is attached to the attachment portion in a state in which the belt member is inserted through a frame of the wheelchair.

In the wheelchair fixing device as set forth in the fifth aspect, after the belt member is pulled out from the retractor and is inserted through the frame of the wheelchair, the other end of the belt member is attached to the attachment portion, to thereby secure the wheelchair. Accordingly, only a single set of retractor and belt member is required.

The wheelchair fixing device as set forth in a sixth aspect of the fourth aspect or the fifth aspect, is configured such that an attachment state between the belt member and the attachment portion is releasable in an emergency.

In the wheelchair fixing device as set forth in the sixth aspect, the user can detach the belt member from the attachment portion in an emergency. An "emergency", as referred to herein, widely includes a case in which a heavy load caused in a vehicle collision or the like is input or a case in which a trouble occurs in the vehicle cabin at the time of vehicle stopping.

The wheelchair fixing device as set forth in a seventh aspect of the sixth aspect, is configured such that a tongue plate is provided on the other end of the belt member; the attachment portion is a buckle to and from which the tongue plate is attachable and detachable; and the buckle is provided with a release button for detaching the tongue plate.

In the wheelchair fixing device as set forth in the seventh aspect, the user can detach the tongue plate from the buckle even in an emergency simply by operating the release button. In addition, as the buckle is detached from the tongue plate, the lock mechanism is switched to the unlocked state, to thereby enable the belt member to be pulled out.

The wheelchair fixing device as set forth in an eighth aspect of any one of the first aspect to the seventh aspect, is configured such that the retractor is disposed to an upright member uprightly provided in a vehicle cabin or inside a vehicle seat, and the retractor is arranged at a height reachable by a hand of an occupant seated in the wheelchair.

In the wheelchair fixing device as set forth in the eighth aspect, the occupant seated in the wheelchair can pull out the belt member from the retractor provided on the upright member or inside the vehicle seat. The meaning that a "height reachable by a hand of an occupant seated in the wheelchair" denotes a height reachable by a hand of a woman having a standard body size and in a state of being seated in the wheelchair.

As described above, according to the wheelchair fixing device of the first aspect, time required for securing the wheelchair and releasing the securing of the wheelchair can be reduced.

According to the wheelchair fixing device of the second aspect, it is unnecessary to provide a device for determining the attachment state of the belt member around the belt member.

According to the wheelchair fixing device of the third aspect, it is possible to prevent the belt member from being pulled out when out of use.

According to the wheelchair fixing device of the fourth aspect, it is possible to perform the switching between the locked state and the unlocked state with higher accuracy as compared with a structure of indirectly detecting the attachment state of the belt member.

According to the wheelchair fixing device of the fifth aspect, the number of components can be reduced as compared with a structure of pulling out respective belt members from a pair of left and right retractors to secure the wheelchair.

According to the wheelchair fixing device of the sixth aspect, it is possible to release the secured state of the wheelchair to move the wheelchair in an emergency.

According to the wheelchair fixing device of the seventh aspect, an existing two-point seat belt can be used, and it is unnecessary to separately provide a release mechanism for releasing the attached state of the belt member.

According to the wheelchair fixing device of the eighth aspect, the wheelchair can be fastened by the hands of the occupant seated in the wheelchair.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a front view of a vehicle seat to which a wheelchair fixing device according to a third embodiment is applied, showing a state in which the wheelchair is secured.

DETAILED DESCRIPTION OF EMBODIMENTS

First Embodiment

Hereinafter, a wheelchair fixing device 10 according to the first embodiment will be described with reference to the drawings. An arrow FR, an arrow UP, and an arrow LH in each drawing respectively indicate the vehicle traveling side (vehicle front side), the vehicle upper side and the vehicle left side of a vehicle to which the wheelchair fixing device is applied. Unless otherwise specified, in the description using respective front and rear, left and right, and up and down directions, these directions indicate frontward and rearward in the vehicle front and rear direction, leftward and rightward in a state of facing the traveling direction, and upward and downward in the vehicle height direction.

Figure 1:
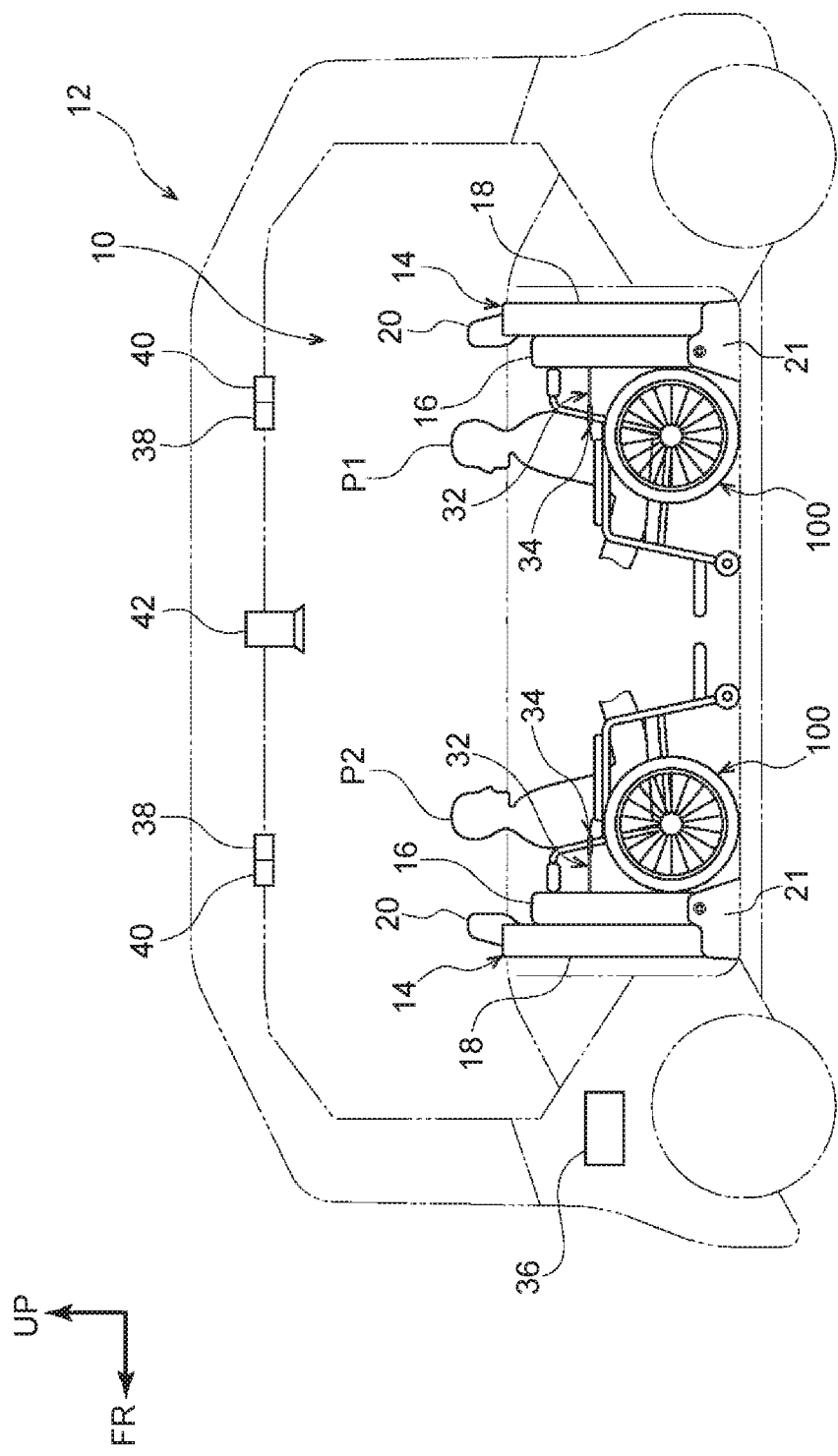
FIG. 1 is a side view of a vehicle cabin of a vehicle to which a wheelchair fixing device according to a first embodiment is applied, as viewed from a vehicle width direction.

As shown in FIG. 1, a vehicle 12 to which the wheelchair fixing device 10 of the present embodiment is applied includes a pair of vehicle seats 14 facing each other in the front and rear direction. Each vehicle seat 14 includes a seat cushion 16, a seat back 18, and a headrest 20.

Here, one end of the seat cushion 16 is turnably connected to a seat base 21. The seat cushion 16 is extended in a substantially horizontal direction such that an occupant can be seated in a normal state. On the other hand, for securing a wheelchair 100 as shown in FIG. 1, the seat cushion 16 is flipped up to the seat back 18 side in advance so as to secure a securing space.

Figure 2:
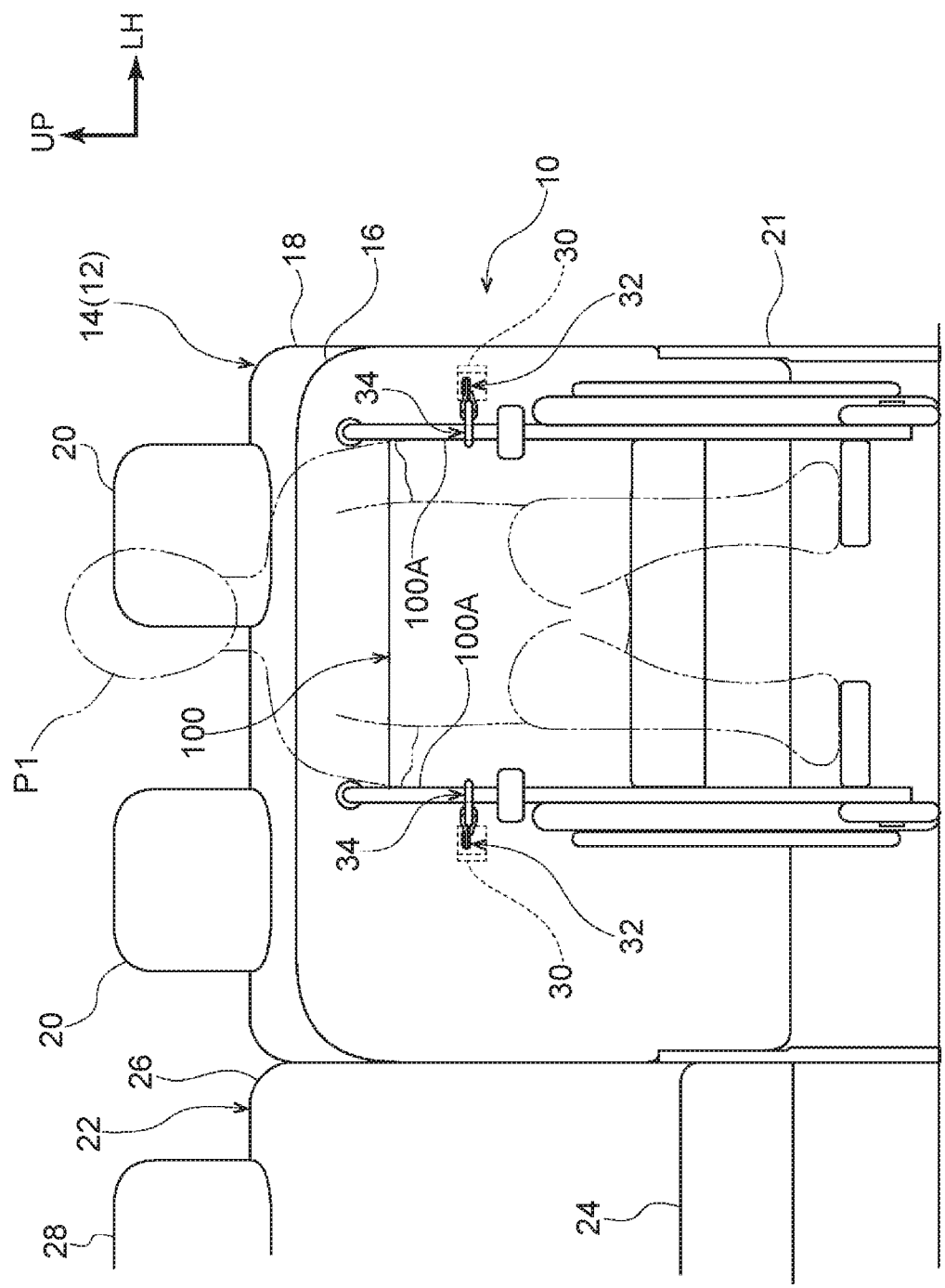
FIG. 2 is a front view of a vehicle seat to which the wheelchair fixing device according to the first embodiment is applied, showing a state in which the wheelchair is secured.

As shown in FIG. 2, the vehicle seat 14 is a bench seat on which two persons can be seated in the vehicle width direction. A vehicle seat 22 is disposed adjacent to the vehicle seat 14 on the right side of the vehicle. The vehicle seat 22 includes a seat cushion 24, a seat back 26, and a headrest 28.

Here, as shown in FIG. 1 and FIG. 2, the vehicle 12 is provided with the wheelchair fixing devices 10. Each wheelchair fixing device 10 mainly includes retractors 30, a belt member 32, a camera 42 as an imaging unit, a lamp 38, a buzzer 40, and an ECU (electronic control unit) 36 as a switching unit.

As shown in FIG. 2, the retractors 30 are disposed inside the vehicle seat 14, and as an example in the present embodiment, the retractors 30 are disposed inside the seat cushion 16. Specifically, each retractor 30 is arranged at a height of an upper body of an occupant P1 seated in the wheelchair 100 in a state in which the seat cushion 16 is flipped up. That is, the retractor 30 is arranged at a height that the hand of the occupant P1 can reach. In addition, a pair of retractors 30 is arranged at substantially the same height on the left side and the right side with the wheelchair 100 interposed therebetween.

Figure 3:
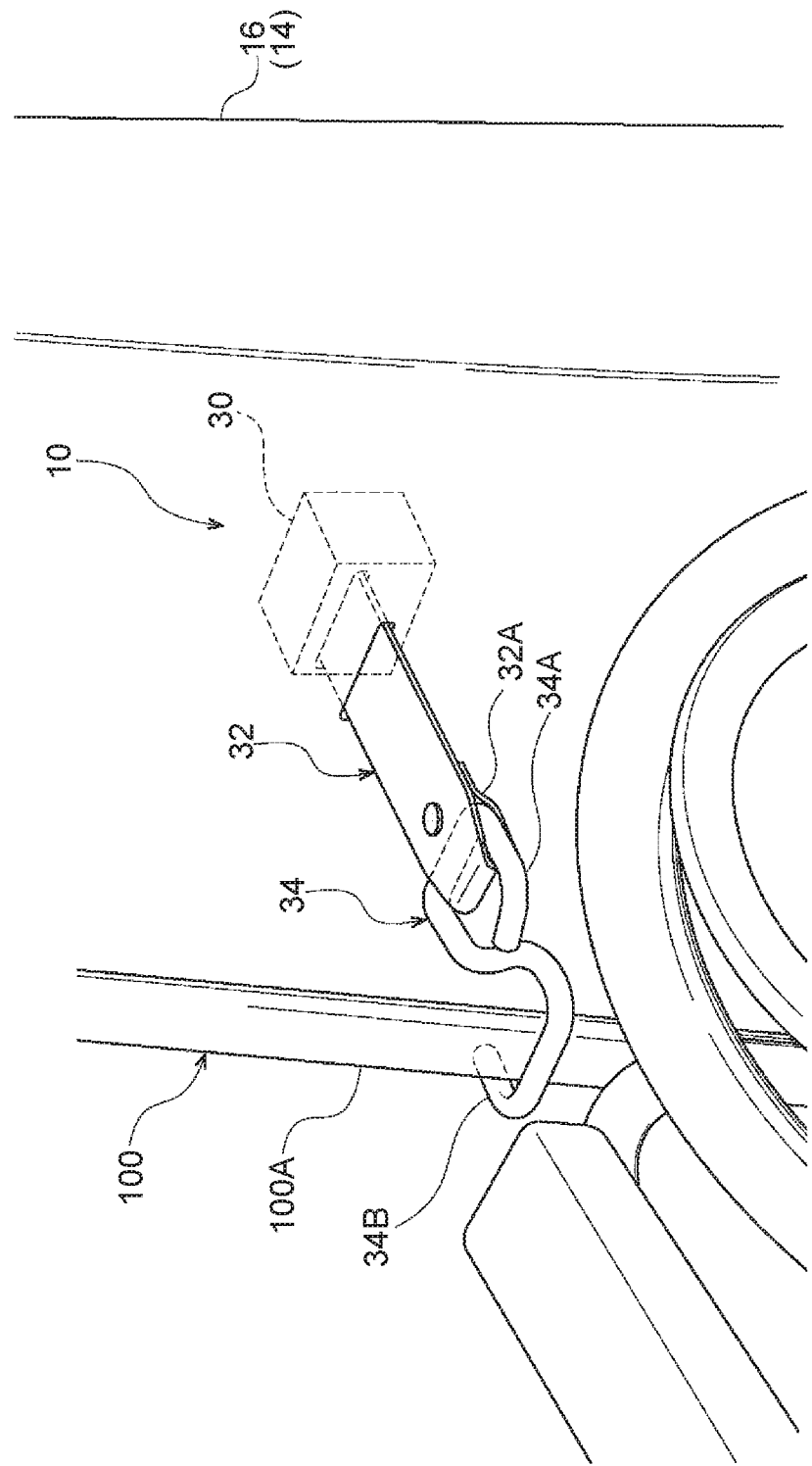
FIG. 3 is an enlarged perspective view of a major part of FIG. 2, as viewed obliquely from above.

As shown in FIG. 3, a belt member 32 is pulled out from each retractor 30. The belt member 32 is formed in a long shape with the same cloth material as that of a webbing used for a seat belt of the vehicle 12. One end of the belt member 32 is wound around a spool (not shown) included in the retractor 30. Here, since the spool is urged by a return spring (not shown) in a direction of winding the belt member 32, the belt member 32 is in a state of being wound around the retractor 30 except for the other end thereof with no load applied to the belt member.

Figure 4:
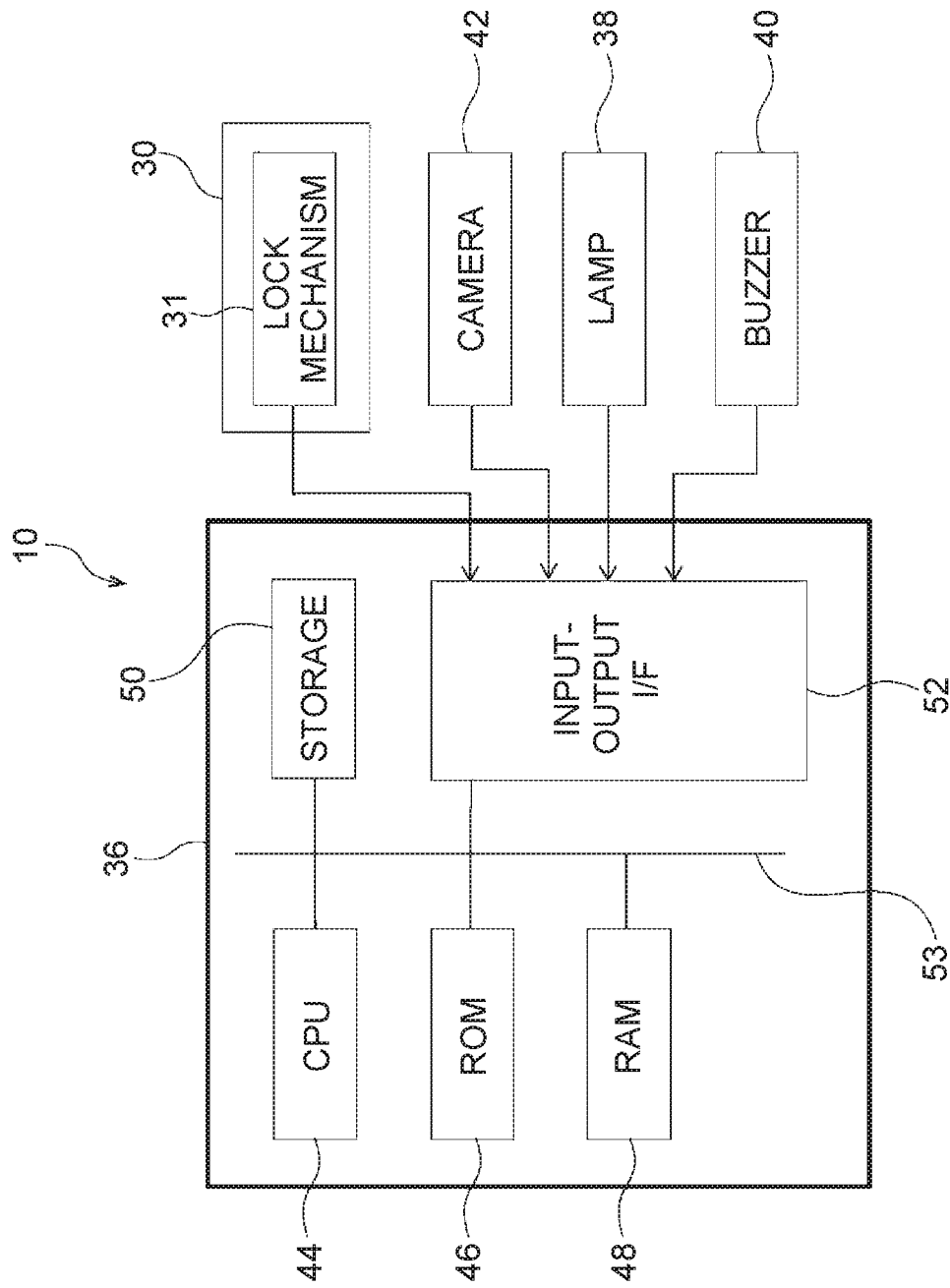
FIG. 4 is a block diagram showing a hardware configuration of the wheelchair fixing device according to the first embodiment.

Here, as shown in FIG. 4, each of the retractors 30 is electrically connected to the ECU 36. Further, the retractor 30 is provided with a lock mechanism 31 that carries out electrical switching between a locked state in which the belt member 32 is disabled to be pulled out and an unlocked state in which the belt member 32 is enabled be pulled out. In the present embodiment, as an example, the lock mechanism 31 using a solenoid and a lock lever is employed. In the lock mechanism 31, the solenoid is energized to move the lock lever so as to release the locked state of the spool. When the solenoid is not energized, the lock lever is moved to the opposite side so as to put the spool into the locked state.

As shown in FIG. 3, the other end of the belt member 32 is folded and stitched to be formed in a hook attachment portion 32A. One end 34A of the hook 34 is attached to this hook attachment portion 32A.

The hook 34 is formed in a substantially S-shape, and is held in a state in which the one end 34A formed in a hook shape is inserted through the hook attachment portion 32A of the belt member 32. The other end 34B of the hook 34 is formed in a hook shape inverse to the hook shape of the one end 34A, and is formed to be attachable to a frame 100A of the wheelchair 100.

As shown in FIG. 1, a camera 42 is provided in the top part of the vehicle 12. The camera 42 is disposed at the center in the vehicle front-rear direction and at the center in the vehicle width direction of a ceiling of a vehicle cabin; and an image of the vehicle cabin including securing spaces of the wheelchairs 100 is captured by this camera 42. In the present embodiment, as an example, a single camera 42 is configured to take an image of both the securing spaces provided at two locations.

The lamp 38 and the buzzer 40 are provided in the ceiling above each securing space. The lamp 38 is configured to be switchable between a lighting state and an extinguished state. When the lamp 38 is turned on, the occupant P1 (or an occupant P2) below the lamp 38 is irradiated with light. The buzzer 40 is configured to output a sound to the occupant P1 (or the occupant P2) below.

The vehicle 12 is provided with the ECU 36 as a control unit. FIG. 4 is a block diagram illustrating a hardware configuration of the wheelchair fixing device 10. As shown in FIG. 4, the ECU 36 included in the wheelchair fixing device 10 includes a CPU (central processing unit) 44, a ROM (read-only memory) 46, a RAM (random-access memory) 48, a storage 50, and an input-output interface 52. These components are connected to one another via a bus 53 such that they can mutually communicate with one another.

The CPU 44 is a central processing unit, executes various programs, and controls each of the components. That is, the CPU 44 reads out a program from the ROM 46 or the storage 50, and executes the program using the RAM 48 as a work area. The CPU 44 controls the above-described components and performs various arithmetic processing in accordance with the programs recorded in the ROM 46 or the storage 50.

The ROM 46 stores various programs and various data. The RAM 48 temporarily stores a program or data as the work area. The storage 50 includes an HDD (hard disk drive) or an SSD (solid state drive), and stores various programs including an operating system, and various data. In the present embodiment, the ROM 46 or the storage 50 stores a switching program for switching the retractors 30 between the locked state and the unlocked state at the time of securing the wheelchair 100.

The lock mechanism 31 (retractors 30), the camera 42, the buzzer 40, and the lamp 38 are connected to the input-output interface 52. The retractors 30, the camera 42, the buzzer 40, and the lamp 38 are controlled in accordance with signals from the ECU 36.

Example of Switching Process

Here, the ECU 36 as the switching unit switches the lock mechanism 31 to the locked state when the hook 34 at the other end of the belt member 32 is attached to the frame 100A of the wheelchair 100. The ECU 36 switches the lock mechanism 31 to the unlocked state when the hook 34 at the other end of the belt member 32 is detached from the frame 100A. An example of this switching process will be described with reference to flowcharts of FIG. 5 and FIG. 6. This switching process is executed as the CPU 44 reads out the switching program from the ROM 46 or the storage 50, expands and executes this program in the RAM 48. First, the switching process of securing the wheelchair 100 will be described with reference to FIG. 5, and then the switching process of releasing the securing of the wheelchair 100 will be described with reference to FIG. 6. In the following description, the case in which the occupant P1 secures the wheelchair 100 and the case in which the occupant P1 releases the securing of the wheelchair 100 will be described.

Figure 5:
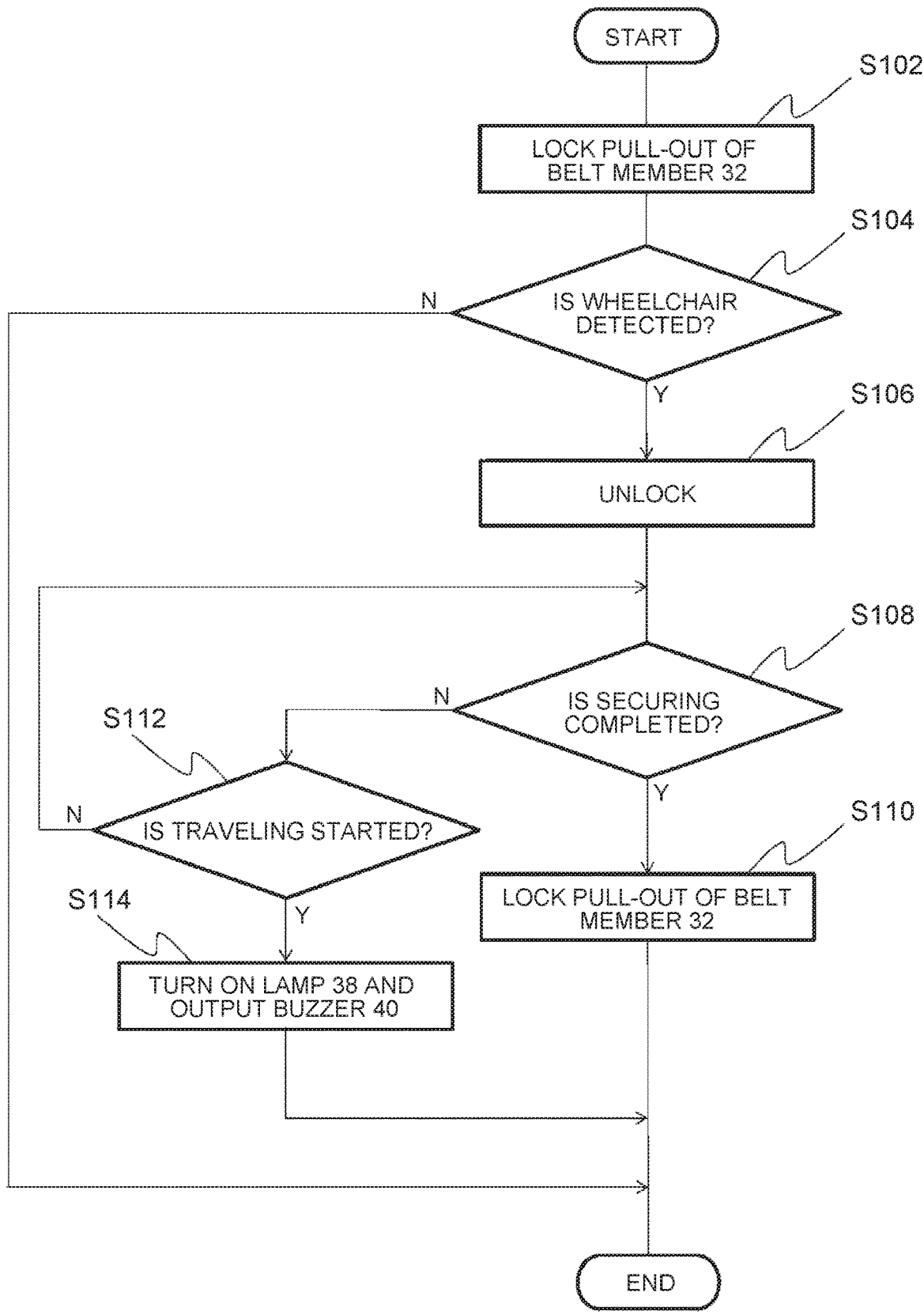
FIG. 5 is a flowchart showing a switching process when the wheelchair is secured in the first embodiment.

As shown in FIG. 5, in step S102, the CPU 44 causes the lock mechanism 31 to lock pull-out of the belt member 32. That is, the lock mechanism 31 is switched to the locked state. When the lock mechanism 31 is in the locked state, the locked state is maintained.

In step S104, the CPU 44 determines whether or not the wheelchair 100 is detected. Specifically, when the wheelchair 100 exists in an imaging range of the camera 42, the CPU 44 determines that the wheelchair 100 is detected based on the signals from the camera 42. When the wheelchair 100 does not exist in the imaging range of the camera 42, the CPU 44 determines that the wheelchair 100 is undetected.

When determining that the wheelchair 100 is detected in step S104, the CPU 44 shifts the process to step S106. When determining that wheelchair 100 is undetected in step S104, the CPU 44 ends the switching process.

The CPU 44 releases the locked state by the lock mechanism 31 in step S106. That is, when the wheelchair 100 is detected in the imaging range of the camera 42 and before the belt member 32 is attached to the wheelchair 100, the CPU 44 switches the lock mechanism 31 to the unlocked state. Thereby, the spool (not shown) can be rotated, so that the belt member 32 can be pulled out from each retractor 30.

The CPU 44 determines whether or not the securing of the wheelchair 100 is completed in step S108. Specifically, after the occupant P1 seated in the wheelchair 100 moves the wheelchair 100 to the securing space, the occupant pulls out the belt member 32 from each retractor 30 and hooks (attaches) the hook 34 on the frame 100A of the wheelchair 100. Then, from an image captured by the camera 42, when determining that the hooks 34 on both sides of the wheelchair 100 are attached to the frame 100A of the wheelchair 100, the CPU 44 determines that the securing of the wheelchair 100 is completed. It may be separately determined whether or not the securing is completed on each of the pair of hooks 34.

In step S108, when determining that the securing of the wheelchair 100 is completed, the CPU 44 shifts the process to step S110. When determining in step S108 that the securing of the wheelchair 100 is not completed, the CPU 44 shifts the process to step S112.

In step S110, the CPU 44 causes the belt member 32 to be locked from being pulled out. That is, when it is determined that the other end of the belt member 32 is in a state of being attached to the wheelchair 100, the lock mechanism 31 is switched to the locked state. Thereby, although the belt member 32 becomes disabled to be pulled out, the belt member 32 is urged in the winding direction by the return spring; thus slack of the belt member 32 is removed. Then, the CPU 44 ends the switching process while maintaining the locked state of the lock mechanism 31.

On the other hand, in step S108, when determining that the securing of the wheelchair 100 is not completed, the CPU 44 proceeds the process to step S112, and then determines whether or not traveling of the vehicle 12 is started. Here, as an example, when the vehicle speed is 5 km/h or more or when a traveling distance from the stopped state of the vehicle is 100 m or more, based on information from a vehicle speed sensor (not shown) installed in the vehicle 12, the CPU 44 determines that the traveling of the vehicle 12 is started.

When determining that the traveling of the vehicle 12 is started in step S112, the CPU 44 shifts the process to step S114. Then, the CPU 44 turns on the lamp 38 and operates the buzzer 40 to output a sound in step S114, to thereby tell the occupant P1 to secure the wheelchair 100. In the present embodiment, two securing spaces are provided; thus, the lamp 38 located on the side corresponding to the securing space where the securing is not yet completed is turned on, and the buzzer 40 on the same side is brought to output a sound at the same time. Note that the lamp 38 and the buzzer 40 may be stopped when a predetermined time passes since the start of the operation. If the state in which the securing is not completed continues, the lamp 38 and the buzzer 40 may be operated periodically.

On the other hand, in step S112, when determining that the traveling of the vehicle 12 is not started, the CPU 44 returns the process to step S108, and repeatedly determines whether or not the securing of the wheelchair 100 is completed.

Figure 6:
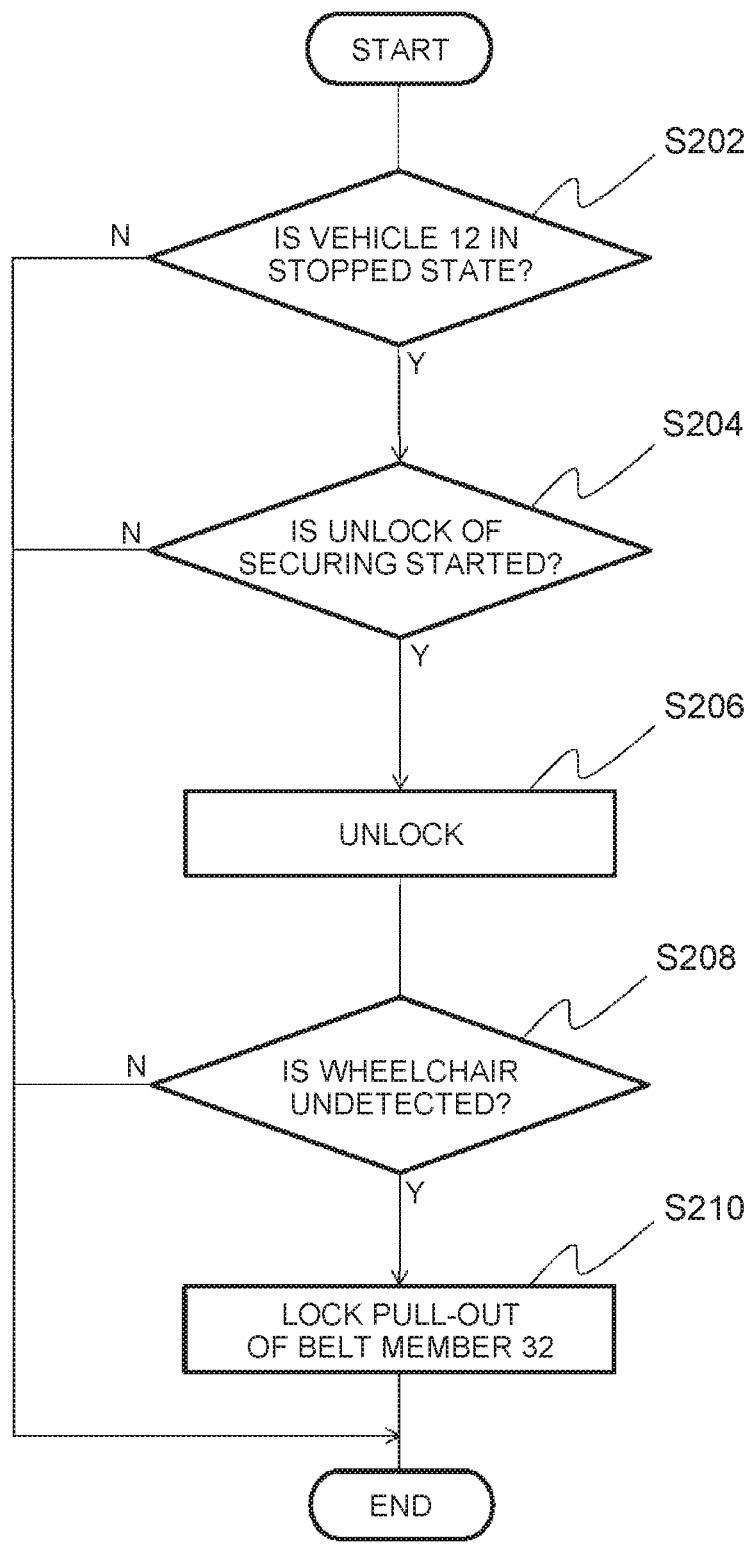
FIG. 6 is a flowchart showing the switching process when the securing of the wheelchair is released in the first embodiment.

With reference to FIG. 6, description will be provided on the switching process in the case in which the securing of the wheelchair 100 is released from the state in which the securing of the wheelchair 100 is completed by the above switching process and the pull-out of the belt member 32 is thus locked by the lock mechanism 31.

As shown in FIG. 6, the CPU 44 determines whether or not the vehicle 12 is in the stopped state in step S202. Specifically, based on information from the vehicle speed sensor (not shown) installed in the vehicle 12, when the vehicle speed becomes 0 km/h, it is determined that the vehicle 12 is in the stopped state.

In step S202, when determining that the vehicle 12 is in the stopped state, the CPU 44 shifts the process to step S204. In step S202, when determining that the vehicle 12 is not in the stopped state, that is, when the vehicle 12 is traveling, the CPU 44 ends the switching process.

The CPU 44 determines whether or not the operation for releasing the securing of the wheelchair 100 is started in step S204. That is, when determining, from the image captured by the camera 42, that the hooks 34 on the both sides of the wheelchair 100 are detached from the frame 100A of the wheelchair 100, the CPU 44 determines that the releasing of the securing of the wheelchair 100 is started. In the present embodiment, from the image captured by the camera 42, when determining that the hand of the occupant P1 grasps the hook 34, the CPU 44 determines that the releasing of the securing of the wheelchair 100 is started.

In step S204, when the CPU 44 determines that the operation for releasing the securing of the wheelchair 100 is started, the CPU 44 shifts the process to step S206 so as to release the lock. That is, the lock mechanism 31 is switched to the unlocked state. Accordingly, the spool (not shown) can be rotated, and thus the belt member 32 can be pulled out from the retractor 30.

On the other hand, in step S204, when the CPU 44 determines that the operation for releasing the securing of the wheelchair 100 is not yet started, the CPU 44 ends the switching process.

After releasing the lock in step S206, the CPU 44 determines whether or not the wheelchair 100 is undetected in step S208. That is, when the wheelchair 100 does not exist in the imaging range of the camera 42, the CPU 44 determines that the wheelchair 100 is undetected.

In step S208, when determining that the wheelchair 100 is undetected, the CPU 44 shifts the process to step S210. In step S208, when determining that the wheelchair 100 is not undetected, that is, when wheelchair 100 is detected, the CPU 44 ends the switching process.

In step S210, the CPU 44 locks the pull-out of the belt member 32. That is, for example, when the occupant P1 releases the securing of the wheelchair 100 and moves the wheelchair 100 or the like and the wheelchair 100 comes out of the imaging range of the camera 42, the CPU 44 switches the lock mechanism 31 to the locked state.

Operational

Next, operation of the present embodiment will be described.

In the wheelchair fixing device 10 according to the present embodiment, as shown in FIG. 4, the retractor 30 is provided with the lock mechanism 31, and the lock mechanism 31 electrically switches the belt member 32 between the locked state in which the belt member 32 is disabled to be pulled out and the unlocked state in which the belt member 32 is enabled to be pulled out. Thereby, as shown in FIG. 3, the belt member 32 can be pulled out from the retractor 30 in the unlocked state, to thereby secure the wheelchair 100. In addition, the movement of the wheelchair 100 can be restrained by electrically switching the lock mechanism 31 to the locked state while the wheelchair 100 is secured.

In the present embodiment, when the hook 34 (the other end of the belt member 32) is attached to the wheelchair 100, the lock mechanism 31 is brought into the locked state. Thereby, the user simply attaches and secures the belt member 32 to the wheelchair 100 so as to disable the pull-out of the belt member 32. On the other hand, in order to bring the lock mechanism 31 into the unlocked state at the time of detaching the hook 34 while the vehicle 12 is stopped, the user enables the belt member 32 to be pulled out without carrying out a special handling. Therefore, in the wheelchair fixing device 10 of the present embodiment, it is possible to reduce time required for securing the wheelchair 100 and for releasing the securing of the wheelchair 100.

In the present embodiment, as described in the flowchart of FIG. 5, when the user attaches the hook 34 to the wheelchair 100, it is determined that the belt member 32 is attached to the wheelchair 100 based on the image captured by the camera 42, and thus the lock mechanism 31 is switched to the locked state. That is, the belt member 32 is disabled to be pulled out.

Furthermore, in the present embodiment, as described in the flowchart of FIG. 6, when the user tries to detach the hook 34 from the wheelchair 100 while the vehicle 12 is stopped, the lock mechanism 31 is switched to the unlocked state. That is, the belt member 32 is enabled to be pulled out from the retractor 30. Accordingly, it is unnecessary to dispose sensors, devices, etc. around the belt member 32 so as to determine the attached state of the belt member 32.

Further, in the present embodiment, when there is no wheelchair in the securing space of the wheelchair 100, the belt member 32 is disabled to be pulled out. Thereby, it is possible to prevent another occupant from pulling out the belt member 32 by mistake. That is, it is possible to prevent the belt member 32 from being pulled out when the belt member is out of use.

Furthermore, in the present embodiment, since the retractor 30 is arranged at a height reachable by the hand of the occupant P1, the occupant P1 seated in the wheelchair 100 can pull out the belt member 32 from the retractor 30. That is, the wheelchair 100 can be secured by the hands of the occupant P1 seated in the wheelchair 100.

Second Embodiment

Next, a wheelchair fixing device 60 according to the second embodiment will be described with reference to FIG. 7. Note that the same configurations as those in the first embodiment will be denoted by the same reference numerals, and description thereof will be omitted.

Figure 7:
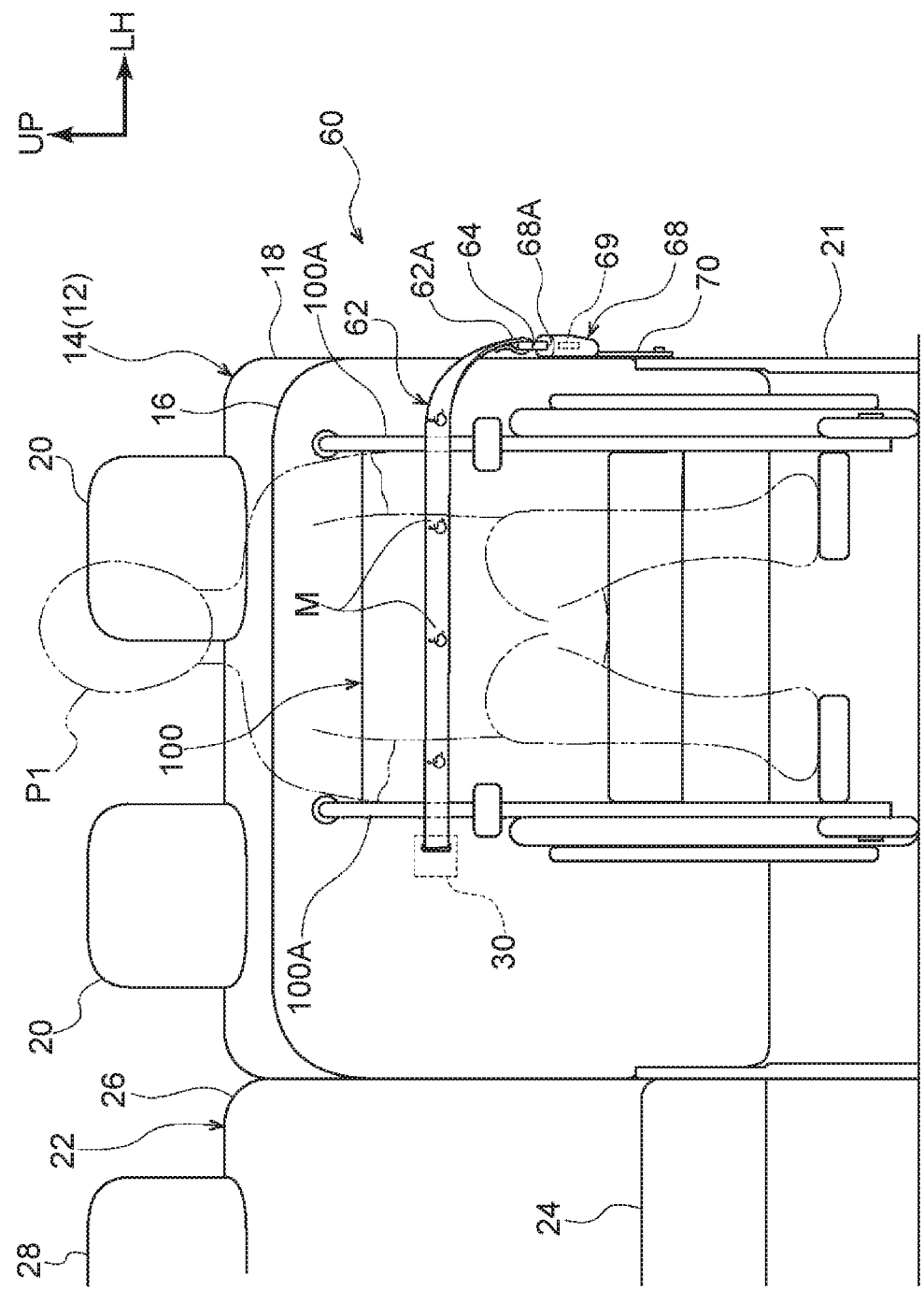
FIG. 7 is a front view of a vehicle seat to which a wheelchair fixing device according to a second embodiment is applied, showing a state in which the wheelchair is secured.

As shown in FIG. 7, the wheelchair fixing device 60 of the present embodiment mainly includes the retractor 30, a belt member 62, and a buckle 68 as an attachment portion. The retractor 30 is arranged at the height of the upper body of the occupant P1 seated in the wheelchair 100 with the seat cushion 16 flipped up. That is, the retractor 30 is arranged at a height that the hand of the occupant P1 can reach. In the present embodiment, the retractor 30 is provided only on the right side of the wheelchair 100, and the retractor 30 is provided with the lock mechanism 31 (see FIG. 4).

The long belt member 62 is pulled out from the retractor 30, and one end of the belt member 62 is wound around the spool (not shown) included in the retractor 30. The other end of the belt member 62 is folded and stitched to be formed into a plate attachment portion 62A. A tongue plate 64 is attached to the plate attachment portion 62A. In the present embodiment, as an example, the width of the belt member 62 is formed to be narrower than a webbing width of a general seat belt, and the belt member 62 has marks indicated by M. Each mark M has a shape imitating the wheelchair 100 so as to be distinguishable from the general seat belt.

On the left side of the vehicle seat 14, the buckle 68 to and from which the tongue plate 64 is attachable and detachable is provided. Specifically, the buckle 68 is provided on the opposite side of the wheelchair 100 from the retractor 30 in a state in which the wheelchair 100 is secured, and is connected to the seat base 21 via a buckle stay 70. The buckle 68 is provided with a release button 68A, and the tongue plate 64 is detached by pushing the release button 68A. That is, the attachment state between the belt member 62 and the buckle 68 can be released in an emergency.

Here, a contact switch 69 as the switching unit is provided inside the buckle 68. The contact switch 69 is configured to be switchable as the tongue plate 64 is engaged with the buckle 68, and is electrically connected to the solenoid included in the lock mechanism 31. When the tongue plate 64 is not engaged with the buckle 68, the solenoid is energized to switch the lock mechanism 31 to the unlocked state. On the other hand, when the tongue plate 64 is engaged with the buckle 68, the solenoid is de-energized to switch the lock mechanism 31 to the locked state.

Operation

Next, operation of the present embodiment will be described.

In the wheelchair fixing device 60 according to the present embodiment, when the occupant P1 secures the wheelchair 100, the occupant P1 moves the wheelchair 100 to the securing space between the retractor 30 and the buckle 68. Then, the occupant P1 pulls out the belt member 62 from the retractor 30 and inserts this belt through the frame 100A of the wheelchair 100; and in this state, the occupant P1 then engages the tongue plate 64 at the other end of the belt member 62 with the buckle 68. Thereby, the contact switch 69 is switched to de-energize the solenoid of the lock mechanism 31. As a result, the lock mechanism 31 is switched to the locked state to disable the belt member 62 to be pulled out, but the belt member 62 is urged in the winding direction by the return spring, and thus the slack of the belt member 62 is removed. The wheelchair 100 can be secured in the above manner.

Here, in the present embodiment, the lock mechanism 31 can be directly switched by the contact switch 69 provided in the buckle 68. Therefore, as compared with a structure that indirectly detects engagement of the tongue plate 64 with the buckle 68 by a sensor or the like provided outside the belt member 62, the lock mechanism 31 can be switched between the locked state and the unlocked state with a high accuracy.

In the present embodiment, only a single set of the retractor 30 and the belt member 62 is necessary for securing the wheelchair 100, and thus the number of components can be reduced as compared with a structure that pulls out respective belt members from the pair of left and right retractors to secure the wheelchair 100.

Further, in the present embodiment, since the buckle 68 is provided with the release button 68A, the occupant P1 can detach the belt member 62 from the buckle 68 in an emergency, so that the occupant P1 can release the secured state of the wheelchair 100 to move the wheelchair 100 in an emergency. In particular, even in an emergency, the tongue plate 64 can be detached from the buckle 68 through the simple operation of the release button 68A by the occupant P1. That is, an existing two-point seat belt can be used, and thus it is unnecessary to separately provide a release mechanism for releasing the attachment state of the belt member 62. The other operations are the same as those in the first embodiment.

Third Embodiment

Next, a wheelchair fixing device 80 according to the third embodiment will be described with reference to FIG. 8. Note that the same configurations as those in the first embodiment will be denoted by the same reference numerals, and description thereof will be omitted.

As shown in FIG. 8, the wheelchair fixing device 80 of the present embodiment mainly includes the retractor 30, a belt member 82, and a hooking portion 86 as the attachment portion. The retractor 30 is arranged at a height that the hand of the occupant P1 can reach. In the present embodiment, the retractor 30 is provided only on the left side of the wheelchair 100. The retractor 30 is provided with the lock mechanism 31 (see FIG. 4).

The long belt member 82 is pulled out from the retractor 30, and one end of the belt member 82 is wound around the spool (not shown) included in the retractor 30. The other end of the belt member 82 is folded and stitched into a hook attachment portion 82A. One end 84A of a hook 84 is attached to this hook attachment portion 82A. Note that, similarly to the second embodiment, a belt member having marks symbolizing the wheelchair 100 may be used.

On the left side of the vehicle seat 14, there is provided the hooking portion 86 on which the hook 84 is hooked. Specifically, the hooking portion 86 is disposed on the opposite side of the wheelchair 100 from the retractor 30 in a state in which the wheelchair 100 is secured.

Here, the upper end and the lower end of the hooking portion 86 are fastened to the seat cushion 16, and the center in the height direction of the hooking portion 86 protrudes in the vehicle frontward direction. The other end 84B of the hook 84 can be hooked on the center in the height direction of the hooking portion 86.

The wheelchair fixing device 80 of the present embodiment includes the camera 42, the lamp 38, the buzzer 40, and the ECU 36 as the switching unit, as in the first embodiment (see FIG. 1 and FIG. 4).

Here, from the image captured by the camera 42, when it is determined that the hook 84 is hooked on the hooking portion 86 while being inserted through the frame 100A of the wheelchair 100, it is determined that the securing of the wheelchair 100 is completed, and thus the pull-out of the belt member 82 is locked. That is, the lock mechanism 31 is switched to the locked state.

On the other hand, from the image captured by the camera 42, when it is determined that the hand of the occupant P1 grips the hook 84, it is determined that release of the securing of the wheelchair 100 is started, and thus the lock of the lock mechanism 31 is released.

Operation

Next, operation of the present embodiment will be described.

In the wheelchair fixing device 60 according to the present embodiment, since the retractor 30 can be set at the height of the hooking portion 86, the wheelchair 100 can be easily secured by simply pulling out the belt member 82 in the vehicle width direction. The other operations are the same as those in the first embodiment and the second embodiment.

In the present embodiment, it is determined that the hook 84 is hooked on the hooking portion 86 based on the image captured by the camera 42; however, the present disclosure is not limited to this, and another method may be employed. For example, it may be configured that a sensor such as an infrared sensor is provided around the hooking portion 86, and this sensor detects that the hook 84 is hooked on the hooking portion 86. In this case, it may be configured that in response to transmission of a signal from the sensor to the ECU 36, the ECU 36 switches the lock mechanism 31 to the locked state or the unlocked state.

As aforementioned, the wheelchair fixing device according to the embodiments has been described; and it is needless to mention that the wheelchair fixing device can be implemented in various modes without departing from the gist of the present disclosure. For example, in each of the above embodiments, the lock mechanism is configured to include the solenoid and the lock lever, but the present disclosure is not limited to this; and other structures may be employed as far as the lock mechanism can perform the electrical switching between the locked state and the unlocked state.

In the above embodiment, the structure in which the retractor 30 is provided inside the seat cushion 16 has been described; however, the present disclosure is not limited to this, and the retractor 30 may be provided in another location. For example, a hand railing as an upright member formed in a substantially column-shape may be provided in the vehicle cabin, and the retractor 30 may be fixed to this hand railing. Alternatively, an upright wall as an upright member may be provided in the vehicle cabin, and the retractor 30 may be fixed to the upright wall.

Furthermore, in the first embodiment, as shown in FIG. 1, it is configured that an image of the plurality of securing spaces is captured by the single camera 42, but the present disclosure is not limited to this. A camera may be provided in each securing space. In addition, the position of the camera 42 is not limited to the ceiling in the vehicle cabin, and the camera 42 may be disposed on a door trim, or the camera may be provided inside the seat cushion 16.

Moreover, in the first embodiment, as described in the flowchart of FIG. 5, when the wheelchair 100 is detected in the imaging range of the camera 42, the lock mechanism 31 is switched to the unlocked state, but the present disclosure is not limited to this. For example, even when the wheelchair 100 is undetected, the lock mechanism 31 may be set to the unlocked state. In this case, the lock mechanism 31 is maintained in the unlocked state until the securing of the wheelchair 100 is completed.

In the second embodiment, as shown in FIG. 7, the buckle 68 is provided with the release button 68A, and the position and the shape of the release button 68A are not particularly limited. For example, the shape of this release button may be substantially the same as that of a release button of a general seat belt device. In addition, as far as the attachment state between the belt member 62 and the buckle 68 can be released in an emergency, another structure may be adopted, instead of the release button 68A.

What is claimed is:

1. A wheelchair fixing device comprising:
a belt member formed in a long shape and having one end wound around a retractor and the other end configured to be attachable to a wheelchair or an attachment portion in a vehicle cabin;
a lock mechanism provided in the retractor and performing electrical switching between a locked state in which the belt member is disabled to be pulled out and an unlocked state in which the belt member is enabled to be pulled out; and
a switching unit switching the lock mechanism to the locked state when the other end of the belt member is attached to the wheelchair or the attachment portion, and switching the lock mechanism to the unlocked state when the other end of the belt member is detached in a stopped state of a vehicle.

2. The wheelchair fixing device according to claim 1, further comprising an imaging unit capturing an image of an inside of the vehicle cabin including a securing space of the wheelchair, wherein
from the image captured by the imaging unit, the switching unit switches the lock mechanism to the locked state when it is determined that the other end of the belt member is in a state of being attached to the wheelchair, and switches the lock mechanism to the unlocked state when it is determined, from the image, that the other end of the belt member is detached from the wheelchair.

3. The wheelchair fixing device according to claim 2, wherein when the wheelchair is not detected in an image range of the imaging unit, the switching unit switches the lock mechanism to the locked state, and when the wheelchair is detected in the image range of the imaging unit and before the other end of the belt member is attached to the wheelchair, the switching unit switches the lock mechanism to the unlocked state.

4. The wheelchair fixing device according to claim 1, wherein:
the switching unit is provided in the attachment portion; and
the lock mechanism is switched to the locked state by the switching unit when the belt member is attached to the attachment portion, and the lock mechanism is switched to the unlocked state by the switching unit when the belt member is detached from the attachment portion.

5. The wheelchair fixing device according to claim 4, wherein:
the attachment portion is provided on an opposite side of the wheelchair from the retractor in a state in which the wheelchair is secured; and
the other end of the belt member is attached to the attachment portion in a state in which the belt member is inserted through a frame of the wheelchair.

6. The wheelchair fixing device according to claim 4, wherein an attachment state between the belt member and the attachment portion is releasable in an emergency.

7. The wheelchair fixing device according to claim 6, wherein:
a tongue plate is provided on the other end of the belt member;
the attachment portion is a buckle to and from which the tongue plate is attachable and detachable; and
the buckle is provided with a release button for detaching the tongue plate.

8. The wheelchair fixing device according to claim 1, wherein the retractor is disposed to an upright member uprightly provided in a vehicle cabin or inside a vehicle seat, the retractor being arranged at a height reachable by a hand of an occupant seated in the wheelchair.

* * * * *